United States Patent [19]

Rovetta

[11] Patent Number: 4,482,288
[45] Date of Patent: Nov. 13, 1984

[54] MECHANICAL ARM

[75] Inventor: Alberto Rovetta, Milan, Italy

[73] Assignee: Alfa Romeo Auto S.p.A., Naples, Italy

[21] Appl. No.: 413,793

[22] Filed: Sep. 1, 1982

[30] Foreign Application Priority Data

Sep. 7, 1981 [IT] Italy .............................. 23818 A/81

[51] Int. Cl.$^3$ .............................................. B25J 11/00
[52] U.S. Cl. ...................................... 414/728; 414/4; 414/718; 901/18; 901/19
[58] Field of Search ............... 414/718, 728, 729, 732, 414/4, 917; 901/18, 19

[56] References Cited

U.S. PATENT DOCUMENTS 3,543,910 12/1970 Devol et al. ........................ 414/728

FOREIGN PATENT DOCUMENTS 2452345 5/1976 Fed. Rep. of Germany ...... 414/732

Primary Examiner—Robert J. Spar
Assistant Examiner—Terrance L. Siemens
Attorney, Agent, or Firm—Charles A. Brown

[57] ABSTRACT

The invention relates to a mechanical arm having four degrees of freedom (or possibilities of motion) and actuated by two electric motors, each motor of these alternately controls the movements corresponding to at least two degrees of freedom. The result is an arm having a mixed control for movement in series and in parallel in which the motions controlled by the same motor are carried out in different instants of time, whereas the motions controlled by different motors can be performed simultaneously.

3 Claims, 3 Drawing Figures

MECHANICAL ARM

This invention relates to a mechanical arm capable of performing the operations which are required for displacing a tool assembly relative to the workpiece.

An object of the present invention is a versatile and efficient mechanical arm, the construction of which, however, is simple, reliable and has a limited bulk.

The invention is concerned with a mechanical arm actuated by electric motors and enjoying four degrees of freedom or possibilities of motion, one in addition to the three which are necessary and sufficient for having the arm to bring the tool assembly in its working position relative to the workpiece to be machined. The arm is thus capable of working with the sequential motions which are the most suitable for optimizing the moving operations, particular care being taken as to the reduction of the times which are required for carrying them out and as to the reduction of the stresses originated both by positive and negative accelerations.

Mechanical arms are already known which are driven by electric motors and which have four degrees of freedom. As a rule, such arms are equipped with a number of motors which is the same as degrees of freedom and all the movements corresponding to said degrees of freedom can be carried out in parallel.

This approach is such as to permit that the operation times may be reduced but not to such a degree as it would theoretically be possible, because the simultaneous occurrence of the movements requires that the displacement velocities and the acceleration which can be adopted for the individual movements be reduced in order that the arm structure may not be unduly stressed.

Thus, it is not always possible to secure such performances as to balance the intricacy, the heavy weight and the bulk of arms so constructed.

In order to improve the mechanical arms of the kind referred to above, one of these arms has been provided, which is driven by a number of motors less than the degrees of freedom, in which arm provision is made so that each motor alternately controls the movements corresponding to at least two degrees of freedom. The result has been an arm having a mixed control, for movement in series and in parallel, in which the movements controlled by the same motor are carried out at different instants of time, whereas the movements controlled by different motors can be performed simultaneously.

Thus, a mechanical arm has been provided, which has both a simplified and lighter-weight structure, but however which are capable of working with accuracy and with adequately reduced positioning times.

The mechanical arm according to the invention consists of a telescopable rod comprising a guideway and a slider, a sweeping extension, a supporting structure and a base. The sweeping extension is secured the tool assembly which is to be displaced. The sweeping extension is pivoted to the slider of the telescopable rod, and the guideway of the telescopable rod being pivoted to the supporting structure, which the latter, in its turn, is rotatably supported by the base. The arm is characterized in that the supporting structure is operatively connected to a first electric motor by a rotary-drive transferring mechanism and by a first clutch-brake unit. The guideway of the telescopable rod is operatively connected to the first electric motor by a first drive-transferring mechanism adapted to convert the rotary motion into a translational. A second clutch-brake unit causes the slider of the telescopable rod to be operatively connected to a second electric motor by a second drive-transferring mechanism which is adapted to convert the rotary motion into a translational motion and being further operatively connected to a first brake adapted to lock it onto the guideway. The sweeping extension is operatively connected to the same second electric motor by the same second drive-transferring mechanism and adapted to convert the rotary motion into a translational motion and being operatively connected to a second brake adapted to lock it on the slider.

The mechanical arm so constructed has the capability of rotating about a first axis perpendicular to the plane of the machine base due to the connection existing between the supporting structure and said base. It has the possibility of effecting elevational movements by rotating about a second axis perpendicular to the first axis due to the connection existing between the supporting structure and the guide of the telescopable rod. It has the additional capability of effecting withdrawing movements due to the connection existing between the slider and the guideway of the telescopable rod. Finally, it is capable of causing the sweeping extension to be rotated about a third axis which is parallel to the second axis. This is due to the connection existing between the sweeping extension and the slider of the telescopable rod. According to the invention, the first rotational motion and the elevational motion are controlled by the same motor and either movement is carried out alternately with the other movement by inserting the clutch relative to the transfer of the kind of drive which has been selected, and by preventing the movement which is not desired by actuating the relative brake. Moreover, according to the invention, the withdrawal movement and the second rotational movement are controlled by the same motor and the same drive-transferring unit and the one of them is effected alternately with the other by releasing the brake on the linkage which permits the preselected movement and by actuating the brake on the linkage which permits the excluded movement.

Characteristic features and advantages of the invention will be better appreciated from a scrutiny of the accompanying drawings FIGS. 1 to 3 which show by way of a nonlimiting example only, an embodiment of the invention which is most preferable.

Figure 1:
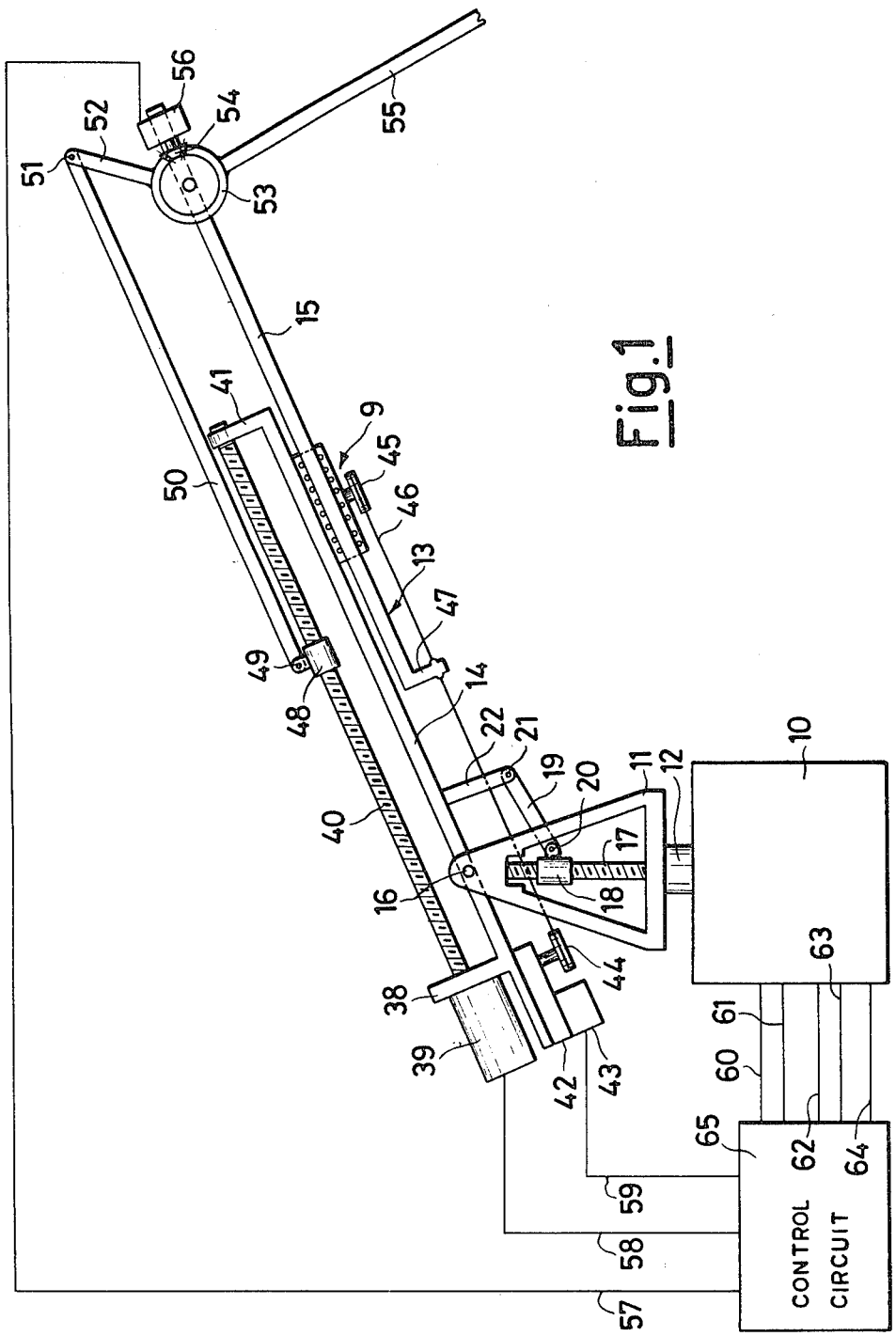
FIG. 1 is a side elevational view of the mechanical arm according to the invention.
Figure 2:
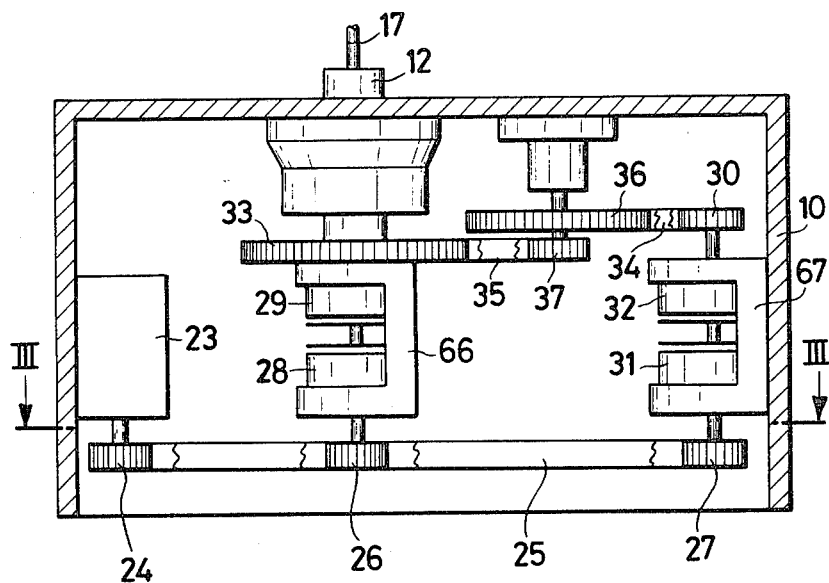
FIG. 2 is a view, on a scale greater than that of FIG. 1, of two drive-transferring mechanisms of the arm in question.

In FIG. 1, the reference numeral 10 indicates the casing of the base which encloses the two drive-transferring mechanisms shown in FIG. 2. At 11, there is indicated a supporting structure having a hollow shaft 12, supported for rotation by the casing 10 of the base. At 13, there is generally indicated a telescopable rod composed of a guideway 14 and a slider 15, and having the guideway 14 pivoted at 16 to the supporting structure 11. The slider 15 is bound to slide on the guideway 14, by the carriage 9. At 17, there is indicated an arbor, also supported for rotation in the base 10 and arranged concentrically relative to the hollow shaft 12. The arbor 17 is screw-threaded and engages the nut 18 via a ball-clutch (not shown). A rod, indicated at 19, is pivoted at 20 to the nut 18 and at 21 to a lever 22 integral with the guideway 14 of the telescopable rod 13.

Figure 3:
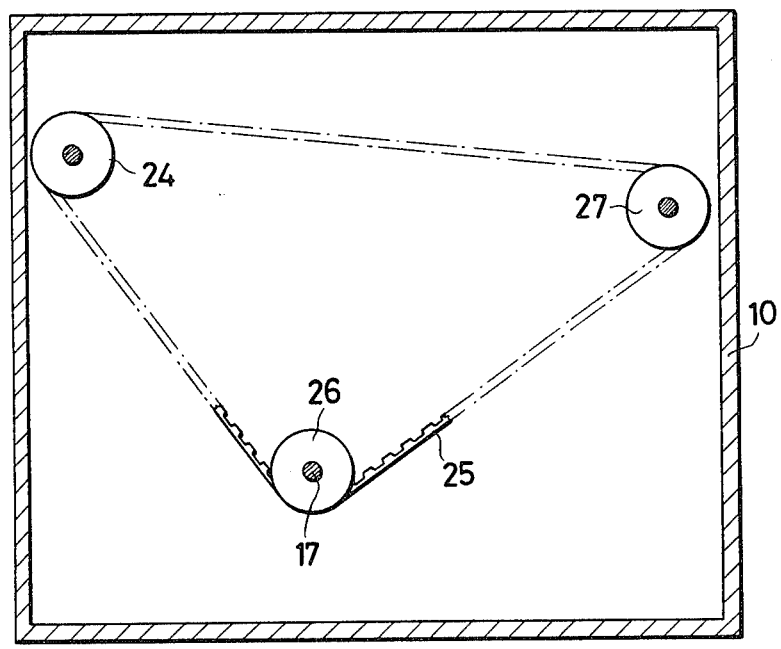
FIG. 3 is a cross-sectional view, taken along the line III—III of FIG. 2.

The drive-transferring mechanism for driving the shafts 12 and 17 can be seen in FIGS. 2 and 3 wherein there is indicated at 23 a small DC electric motor which, via the toothed sheave 24 and the toothed belt 25, drives to rotation the toothed sheaves 26 and 27. The sheave 26 is united to the arbor 17 via the clutch-brake unit 28, 29 (in the case in point this is an electromagnetic-type unit) which is borne by the stirrup 66. The toothed sheave 27 is connected to the toothed sheave 30 by the clutch 31-brake 32 unit (these also of electromagnetic type) which is supported by the stirrup 67. The toothed sheave 30, in its turn, is connected to the toothed sheave 33, integral with the hollow shaft 12, by the toothed belts 34 and 35 and the auxiliary toothed belts 36 and 37, also supported for rotation in the casing 10 of the machine base.

The guideway 14 of the telescopable rod 13 has secured integrally therewith a bracket shown at 38 which supports the electric DC motor 39 and one end of the screw-threaded arbor 40 driven to rotation by the same motor 39, the other end of the screw-threaded arbor 40 being supported by the bracket 41 integral with the guideway 14 of the telescopable rod 13.

The bracket 38 also supports a revolution-multiplying mechanism indicated at 42, which is connected to an electromagnetic type brake indicated at 43 and to a drive transfer mechanism connected to the slider 15: the latter drive-transfer mechanism consists of the sheaves 44 and 45 integral with the guideway 14 and of the chain 46 secured to the bracket 47 which is integral with the slider 15. The revolution-multiplying mechanism 42 permits to reduce the braking torque which is required to lock the slider 15 to the guideway 14. The screw-threaded arbor 40 engages, via a ball-clutch (not shown) the nut 48, to which is pivoted at 49 either end of a rod indicated at 50, the other end of which is pivoted at 51 to a lever, shown at 52, which is integral with the sweeping extension 55, the latter carrying the tool assembly to be positioned (not shown). The sweeping extension 55, in its turn, is pivoted to either end of the slider 15 and is integral with a bevel gear indicated at 53, the latter being coupled to the bevel pinion 54 supported for rotation by the slider 15. At 56 there is indicated an electromagnetic-type brake integral with the arm 15 which permits that the bevel pinion 54 might be blocked to the slider 15, the same being true of the sweeping extension 55. The use of the revolution-multiplying mechanism between the sweeping extension 55 and the brake 56 permits that the braking torque be reduced which is required for locking the sweeping extension 55 to the slider 15. Lastly, there is indicated by the block 65 a control circuit which, via the lines 57, 58, 59, 60, 61, 62, 63, 64, sends the control signals to the brake 56, the motor 39, the brake 43, the motor 23, the clutch 28-brake 29 unit and the clutch 31-brake 32, respectively. There have not been shown the sensors which detect the positions taken by the sweeping extension 55, the slider 15, the guideway 14 and the structure 15.

To position the tool assembly borne by the sweeping extension 55, the circuit 65 processes the signals delivered thereto by the sensors of the positions of the several component parts of the arm and sends the control signals to the motors, the brakes, the clutches to effect the movements which are required for performing the desired overall displacements.

The electric motor 23 can command the rotation of the supporting structure 11 about the axis of its shaft 12 through the drive-transfer mechanism comprising the belts 25, 34 and 35, as the electromagnetic brake 32 is released and the electromagnetic clutch 31 is actuated. The same electric motor can alternately command the elevation of the telescopable rod 13 through the displacements of the nut 18 in the direction of the axis of the screw-threaded arbor 17, which is driven to rotation through the drive-transfer assembly comprising the belt 25, as the electromagnetic brake 29 is released and the electromagnetic clutch 28 is actuated.

As soon as the requested displacement has been carried out, the rotation of the supporting structure 11, or the elevation of the telescopable rod 13 are discontinued by shifting the relative clutch (31 or 28) and by pressing the relative brake (32 or 29). It becomes thus possible to shift the motion of the electric motor 23 from the command of the rotation of the structure 11 to the command of the lift (elevation) of the rod 13, and vice versa.

The electric motor 39 can command the sliding motion of the slider 15 relative to the guideway 14 through the drive transfer mechanism comprising the screw-threaded arbor 40, the nut 48 and the rod 50, as the sweeping extension 55 is locked on the slider 15 by the brake 56.

The slider 15 is guided in its sliding motions by the driving assembly comprised of the sheaves 44 and 45 and the chain 46. The same electric motor 39 can command, as an alternative, the rotation of the sweeping extension 55 through the drive-transfer assembly comprised of the screw-threaded arbor 40, the nut 48, the rod 50 and the lever 52, as the slider 15 is locked on the guideway 14 by the agency of the brake 43.

As the requested displacement has been carried out, the withdrawal of the slider 15, or the rotation of the sweeping extension 55 are over as the relative brake (43 or 56, respectively) is actuated. The shift of the movement of the motor 39 from commanding the withdrawal of the slider 15 to commanding the rotation of the sweeping extension 55, and vice versa, takes place by releasing the brake of the sweeping extension, or by releasing the brake for the slider, respectively.

Thus, the rotation of the supporting structure 11 can be carried out simultaneously either with the withdrawal of the slider 15, or the rotation of the sweeping extension 55 and, likewise, the elevation of the telescopable rod 13 can be carried out either simultaneously with the withdrawal of the slider 15, or with the rotation of the sweeping extension 55.

I claim:

1. A mechanical arm consisting of a telescopable rod (13) comprising a guideway (14) and a slider (15), a sweeping extension (55), a supporting structure (11) and a base (10), the sweeping extension to which a tool assembly to be displaced is secured, being pivoted to the slider (15) of said telescopable rod (13), the guideway (14) of said telescopable rod (13) being pivoted to said supporting structure (11), which latter, in its turn, is rotatably supported (12) by the said base (10), the arm being characterized in that said supporting structure (11) is operatively connected to a first electric motor (23) by a rotary drive transferring mechanism (24, 25, 26, 27) and by a first clutch-brake unit (28, 29), said guideway (14) of the telescopable rod (13) being operatively connected to said first electric motor (23) by a first drive-transferring mechanism adapted to convert rotary motion (17, 18) into a translational motion and by a second clutch-brake unit (31, 32), the slider (15) of said telescopable rod (13) being operatively connected to a second electric motor (39) by a second drive-transferring mechanism (40, 48) adapted to convert rotary motion into a translational motion and being operatively connected to a first brake (43) adapted) to lock in onto the guideway, said sweeping extension (55) being operatively connected to the same second electric motor (39) by the same second drive-transferring mechanism (40, 48) adapted to convert the rotary motion into a translational motion and being operatively connected to a second brake (56) adapted to lock it on said slider (15).

2. A mechanical arm according to claim 1, characterized in that said first drive-transfer mechanism comprises a screw-threaded arbor (17) engaging a nut (19) through a ball-clutch.

3. A mechanical arm according to claim 1, characterized in that said second drive-transfer mechanism comprises a screw-threaded arbor (40) engaging a nut (48) through a ball-clutch.

* * * * *